United States Patent [19]

Brunson

[11] Patent Number: 5,329,579

[45] Date of Patent: Jul. 12, 1994

[54] MODULAR ADJUNCT PROCESSOR MADE OF IDENTICAL MULTI-FUNCTION MODULES ADAPTABLE UNDER DIRECTION OF ONE OF THEM TO PERFORM ANY OF THE ADJUNCT-PROCESSOR FUNCTIONS

[75] Inventor: Gordon R. Brunson, Broomfield, Colo.

[73] Assignee: AT&T Bell Laboratories, Murray Hill, N.J.

[21] Appl. No.: 919,674

[22] Filed: Jul. 27, 1992

[51] Int. Cl.⁵ .................. H04M 1/64; H04M 3/42; G05B 15/00

[52] U.S. Cl. .................. 379/88; 364/132; 379/201; 379/269; 379/242; 379/67

[58] Field of Search .................. 379/88, 89, 201, 214, 379/269, 204, 205, 206; 364/130, 131, 132, 134, 140

[56] References Cited

U.S. PATENT DOCUMENTS

| | | | |
|---|---|---|---|
| 4,459,655 | 7/1984 | Willemin | 364/132 |
| 4,549,047 | 10/1985 | Brian et al. | 379/88 |
| 4,628,436 | 12/1986 | Okamoto et al. | 364/134 |
| 4,640,991 | 2/1987 | Matthews et al. | 370/84 |
| 4,885,770 | 12/1989 | Croll | 379/269 |
| 4,894,857 | 1/1990 | Szlam et al. | 379/67 |
| 4,959,854 | 10/1990 | Cave et al. | 379/201 |
| 4,985,913 | 1/1991 | Shalom et al. | 379/76 |
| 5,036,453 | 7/1991 | Renner et al. | 364/200 |
| 5,072,374 | 12/1991 | Sexton et al. | 364/132 |

Primary Examiner—James L. Dwyer
Assistant Examiner—Daniel S. Hunter
Attorney, Agent, or Firm—David Volejnicek

[57] ABSTRACT

A voice-mail system (10) is assembled from one (100) or more (100-102) programmable multi-function boards all of which are interchangeable and physically identical. The voice-mail system functionality is distributed, on a function-by-function basis, among the modules of the system, each one of which can perform any one or more, or all, of the requisite functions. One of the modules is designated a master module (100). Under program control, it specifies to all the modules which functions that module is to perform. Under program control, each of the modules responds to the specification by loading itself with requisite programs whose execution will result in the performance of the specified functions. No separate and distinct resource-management module is needed.

12 Claims, 12 Drawing Sheets

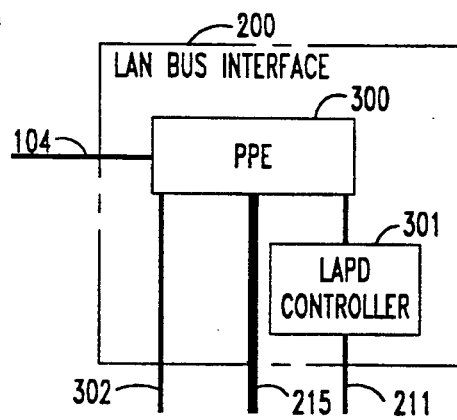
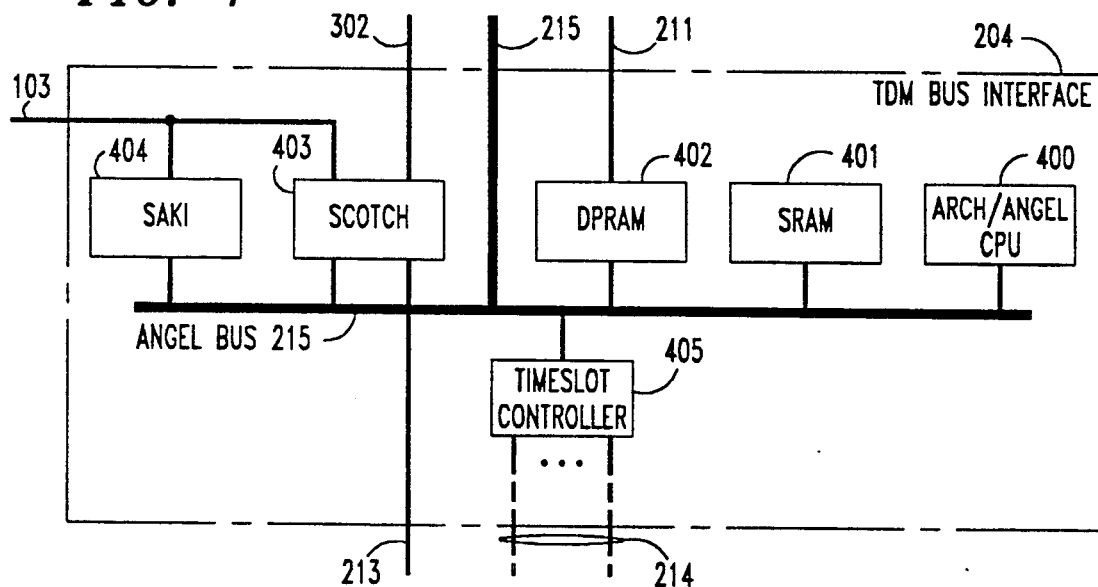
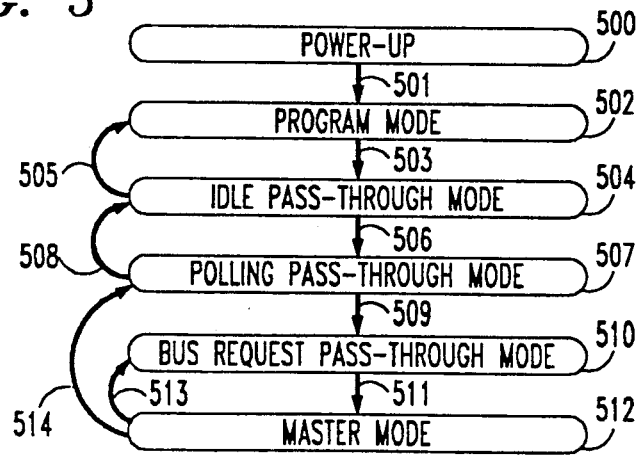

MODULAR ADJUNCT PROCESSOR MADE OF IDENTICAL MULTI-FUNCTION MODULES ADAPTABLE UNDER DIRECTION OF ONE OF THEM TO PERFORM ANY OF THE ADJUNCT-PROCESSOR FUNCTIONS

CROSS-REFERENCE TO RELATED APPLICATION

This application incorporates by reference the following applications:

G. R. Brunson and R. D. Reeder, "Adjunct Processor Embedded in a Switching System", Ser. No. 07/826,345, filed Jan. 27, 1992, and assigned to the same assignee as this application; and G. R. Brunson and D. J. Marinelli, "Board Removal Detection Circuit", Ser. No. 07/869,413, filed Apr. 16, 1992, and assigned to the same assignee as this application.

1. Technical Field

The invention relates generally to telecommunications adjunct processors, and specifically to voice-mail systems.

2. Background of the Invention

Adjunct processors are typically used in conjunction with telecommunications systems to provide to users telecommunications features and services that switching systems and their intelligence (i.e., their control processors) are not designed to, or are ill-equipped to, provide. A well-known illustrative example thereof are voice-mail systems. Adjunct processors such as voice-mail systems must be capable of performing a multiplicity of sophisticated functions, such as database processing, file serving, feature processing, voice processing, and networking, in order to effect their external, user-related, functions. conventional adjunct processor architectures typically use special-purpose designs for each of the major internal functions. Furthermore, each function is typically implemented in one or more circuit boards, also generally referred to as circuit packs, dedicated to that function.

This architecture makes it difficult to reduce the cost of a small adjunct processor or to increase the capacity of an existing adjunct processor. On one hand, even a small system must perform the full complement of internal functions expected of the adjunct processor, and hence requires the full complement of circuit packs. System expansion, on the other hand, eventually reaches a point where further expansion requires the addition of a whole additional adjunct processor arranged in a networking configuration with the original system, because of capacity limitations which are usually imposed on systems to make them cost-effective at smaller capacities.

It is known to configure communications-processing arrangements from a plurality of reconfigurable multi-function resource modules operating under control of a resource manager. Based upon a determination of what resources, i.e., what functions, are required of the arrangement at a given time in order for the arrangement to meet demands being made upon it, the resource manager reconfigures the resource modules to provide the necessary functions. An illustrative example of an arrangement of this type is disclosed in U.S. Pat. No. 4,959,854.

The flexibility achieved by the architecture of the just-described arrangement goes a long way toward facilitating growth of the arrangement in small increments over a wide range of processing capacity. Nonetheless, it does not entirely solve the previously-mentioned problems. This architecture still requires the use of a unit separate from the resource modules that is dedicated to performing the system-management function and that must, from the beginning, be engineered and sized to handle the maximum size of the arrangement, i.e., the maximum number of resource modules, to which the arrangement will be allowed to grow. Thus, the resource manager either represents a disproportionately large cost of a small arrangement of this nature that has a significant growth capability, or acts as the limiting factor on the arrangement's capability to experience significant growth in capacity. Furthermore, the complexity and cost of manufacturing the arrangement remain relatively high on account of the resource manager and the resource modules being different units, both functionally and physically.

SUMMARY OF THE INVENTION

This invention is directed to solving these and other problems and disadvantages of the prior art. According to the invention, in an arrangement such as a communications processing arrangement of the adjunct processor type, that is constructed from a set of one or more multi-function modules, e.g., circuit boards, that together perform a set of requisite functions, such as the communications-processing functions, all of the modules of the set are interchangeable. Preferably, the modules of the set are physically identical. Each module of the set is configurable to perform any one or more of the requisite functions. Significantly, the configuration of the modules of the set takes place under the direction of one of those modules which is designated as a master module, as opposed to taking place under control of a separate, dedicated, and different management entity. The master module includes means, such as a program which it executes, that specifies to each module of the set, including to the master module, the one or more functions of the set of requisite functions that the subject module is to perform. Additionally, each module of the set includes means, again such as a program which it executes, that responds to the specification by adapting the subject module to perform the specified one or more functions. Illustratively, the adaptation is accomplished by means of obtaining and storing for execution programs whose execution by the subject module causes the module to perform the specified one or more functions.

By using multi-function reconfigurable modules, the arrangement achieves great versatility and capacity for growth. In the simplest configuration, the arrangement comprises only one multi-function module which is configured to perform all requisite functions, but has a relatively small throughput capacity as a consequence. As throughput needs increase and capacity of the arrangement becomes inadequate, more and more modules are added and the requisite functionality is divided between them. Yet because one of the multi-function modules itself—the master module—acts as the resource manager and controls the configuration of the modules in the arrangement, the arrangement does not incur the cost and complexity of having a separate, and typically dedicated, resource manager. Also, because the master module merely specifies what the division of labor will be between a plurality of modules, but the modules themselves adapt themselves to the specified division, the resource-managing capability of the master module is not substantively a limiting factor on growth of the arrangement, but rather the arrangement can theoretically grow in size almost indefinitely. Furthermore, because the arrangement is made up of only the one type of module and does not require a distinct manager module, only the one type of module need be manufactured, in higher quantities than would be the case if a plurality of module types were required. This substantially improves the cost, efficiency, and ease of manufacturing of the required modules. And because only modules of the one type need to be assembled together to create the desired arrangement, the cost and ease of manufacturing the arrangement from the component modules is improved as well.

These and other advantages and features of the invention will become apparent from the following description of an illustrative embodiment of the invention considered together with the drawing.

BRIEF DESCRIPTION OF THE DRAWING

FIG. 3 is a block diagram of the LAN bus interface of the MFB of FIG. 2;

FIG. 4 is a block diagram of the TDM bus interface of the MFB of FIG. 2;

FIG. 5 is a state diagram of the I/O DMA controller of the MFB of FIG. 2;

FIGS. 7 and 11-13 are functional flow diagrams of the firmware of the CPU of a slave MFB of FIG. 1;

DETAILED DESCRIPTION

Figure 1:
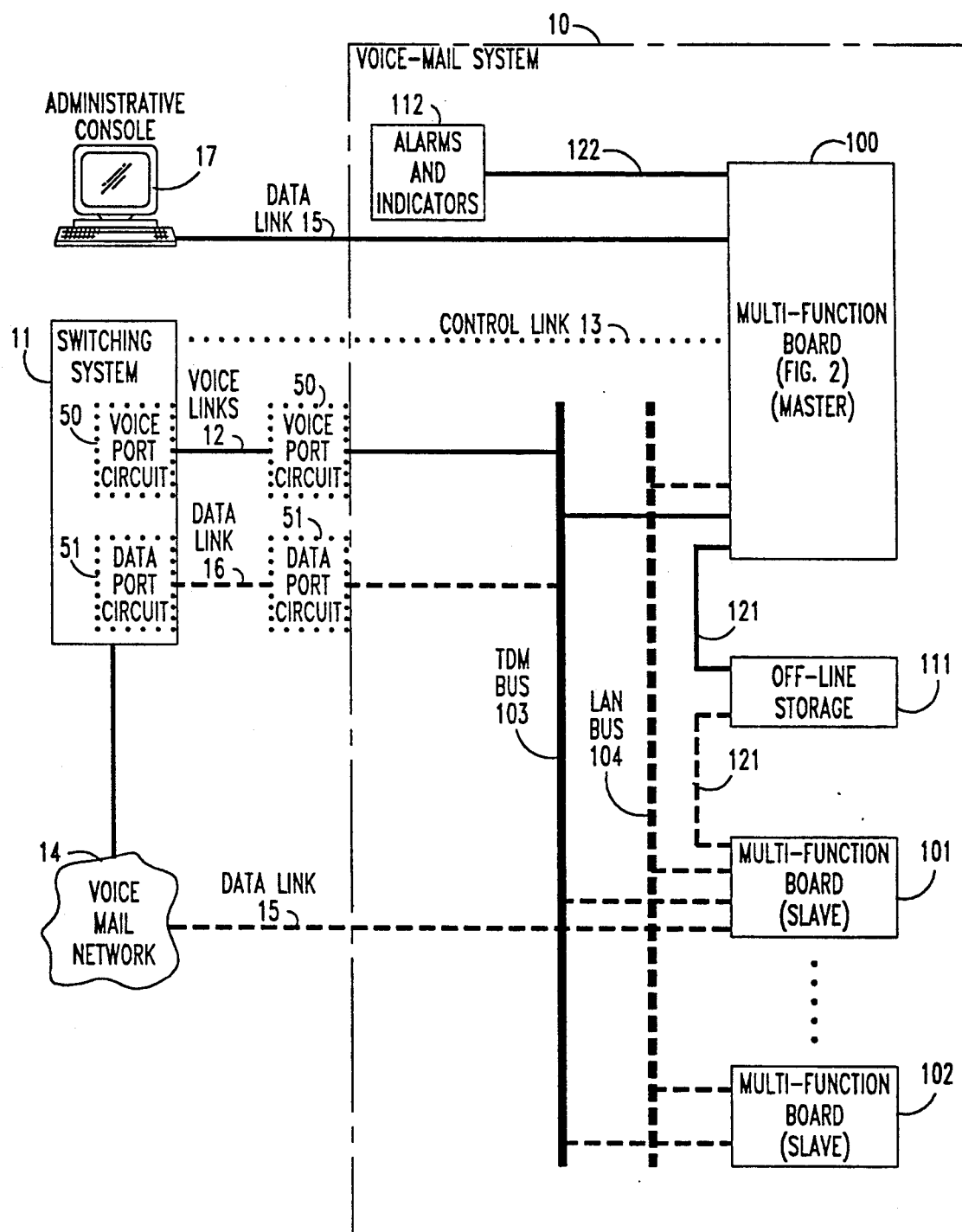
FIG. 1 is a block diagram of an illustrative voice-mail system that incorporates an illustrative embodiment of the invention.

FIG. 1 shows a voice-mail system 10 constructed according to the invention and serving as an adjunct processor to a switching system 11. System 11 is illustratively an AT&T System 75 or Definity® PBX. Voice-mail system 10 can be connected to system 11 in one of two configurations: adjunct and embedded.

In the adjunct configuration, voice-mail system 10 is typically a separate unit from switching system 11, operates under its own power, and is connected to switching system 11 by voice links 12, a data link 16, and a control link 13, as is conventional. In the case of switching system 11 being the AT&T System 75 or Definity PBX, voice links 12 and data link are coupled to the internal voice and data communication medium—a time-division multiplexed (TDM) bus—of switching system 11 and to system 10 by conventional voice-port circuits 50 and data-port circuits 51. Dotted lines are used in FIG. 1 to show elements which are used in the adjunct configuration but not in the embedded configuration.

In the embedded configuration, voice-mail system 10 is physically incorporated into switching system 11. It plugs directly into card slots of the backplane bus of switching system 11, and is powered by switching system 11. The embedded configuration is described in U.S. application Ser. No. 07/826,345, filed on Jan. 27, 1992 and assigned to the same assignee as this application. It is hereby incorporated herein by reference. In the case of switching system 11 being the AT&T System 75 or Definity PBX, voice links 12 is the TDM bus of switching system 11, and voice-port circuits 50 and data-port circuits 51 are not used. Also, the TDM bus of switching system 11 is used to convey control information to voice mail system 10, so control link 13 is optional.

Voice-mail system 10 is configured from one or more multi-function boards (MFBs) 100-102 that are interconnected by a time-division multiplexed (TDM) bus 103 and a local-area network (LAN) bus 104. TDM bus 103 serves as the voice links 12 to switching system 11, either directly or through voice-port circuit 50. In the embedded configuration, where switching system 11 is the AT&T System 75 or Definity PBX, LAN bus 104 is the internal LAN bus of the PBX.

In a single-MFB configuration, the single MFB 100 alone performs all voice-mail system functions; other MFBs 101-102 are absent from system 10, and LAN bus 104 is either also absent or is not used. Dashed lines are used in FIG. 1 to show elements of system 10 which are present in the multi-MFB configuration but which are not needed in the single-MFB configuration.

In a multi-MFB configuration, the functionality of voice-mail system 10 is reconfigurably distributed across a plurality of MFBs 100-102, and different functions of voice-mail system 10 are performed by different MFBs 100-102. One MFB 100 acts as the system master and controls the operation of system 10, while the other MFBs 101-102 act as slaves and operate under control of master MFB 100. However, the plurality of MFBs 100-102 are interchangeable, and in fact are physically identical.

Voice mail system 10 also includes peripherals, such as off-line storage 111 and alarms and indicators 112. Off line storage 111 comprises conventional disk storage that is conventionally used for storing programs, messages, and subscriber data. Off line storage further comprises conventional tape storage that is conventionally used for backup, system restoration, and the loading of new generic software. MFB 100 in a single-MFB configuration, or one or more of the MFBs 100-102 which are acting as a database processor and file server in a multi-MFB configuration, is/are connected to off-line storage 111 via a link 121. Alarms and indicators 112 comprise conventional alarms and indicators that are used to indicate system operational status, to alert craft persons of trouble with system 10, and to keep track (e.g., counts) of system faults and operational parameters. Master MFB 100 is connected to alarms and indicators 112 via a link 122.

Figure 2:
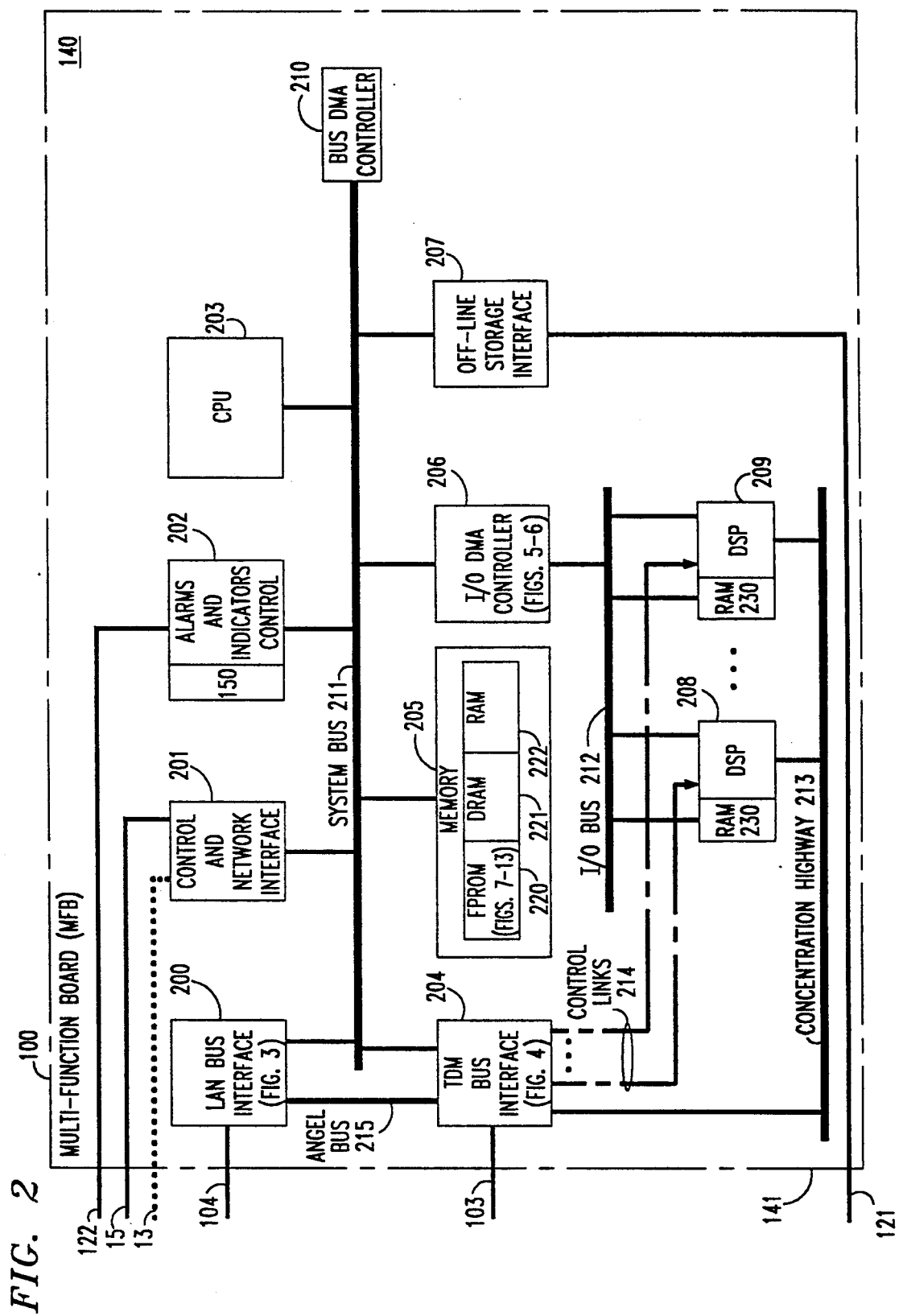
FIG. 2 is a block diagram of a multi-function board (MFB) of the system of FIG. 1.

Physically, all MFBs 100-102 are identical; a voice-mail functional "personality" is programmed into an MFB and is reprogrammable. An illustrative MFB 100 is shown in FIG. 2. As shown, MFB 100 comprises a plurality of functional elements 200-210 that are interconnected by communications media 211-213, all implemented on a single circuit board 140.

Circuit board 140 is the size of AT&T Definity and System 75 port circuit boards—approximately 20 cm. (8 in.)×33 cm. (13 in.). It is a double-sided multi-layer board that uses the via-in-pad and buried-via technologies. The circuits of MFB 100 are mounted on circuit board 140 using double-sided surface-mount technology. All external connections to circuit board 140 are made along one edge 141 thereof in order to facilitate the making of all connections and disconnections substantially simultaneously, but in a proper sequence. Proper sequentiality is ensured through use of backplane connection pins of different lengths and through the use of sequencing pins, as is conventional.

System bus 211 is a parallel multi-master processor bus that provides high-speed interconnection between elements 200-207 without significant involvement of CPU 203. Transfers across system bus 211 to and from a memory 205 occur via direct memory access. To control these accesses and to resolve contention by elements 200-204 and 206-207 for memory use, system bus 211 included a bus DMA controller 210, which is illustratively the Intel 82370 ™ DMA controller.

Central processing unit (CPU) 203 is a high-speed (e.g., 16 MHz) general-purpose microprocessor operating under the control of an operating system that supports multiprocessor operation. Illustratively, CPU 203 is an Intel 80386SX microprocessor executing the UNIX ® SVR4 operating system. CPU 203 executes programs from memory 205 that control operation of the other elements 200-202 and 204-209 of MFB 400 and that provide the voice-mail functionality.

Memory 205 comprises three parts: a flash programmable read-only memory (FPROM) 220, a dynamic random access memory (DRAM) 221, and a non-volatile RAM 222. FPROM 220 is an in-circuit field-programmable non-volatile memory containing firmware, such as a bootstrap program that is necessary to load software from off-line storage 111 into DRAM 221, which is executed by CPU 203 upon reset of MFB 100. The firmware is described in conjunction with FIGS. 7-13. Non-volatile RAM 222 is used to store configuration data for MFB 100 that define its particular present configuration and functionality, and to retain this data even in the event of power loss. DRAM 221 is a general-purpose volatile on-line memory used for storage of programs executing on CPU 203 and for data buffering. It includes an associated DRAM refresh controller, such as an Intel 82370 DRAM refresh controller. Illustratively, the DMA refresh controller is implemented by the same Intel device that implements controller 210. Illustratively, DRAM 221 has 15 Mbytes of storage space.

Alarms and indicators control 202 is a microprocessor and associated circuitry that conventionally monitors the sanity of CPU 203, provides maintenance access for alarm reporting, and controls indicator display of monitored parameters. Control 202 includes an "I've been pulled" circuit 150 that indicates, upon loss and subsequent restoration of power to MFB 100, whether MFB 100 remained physically connected to the rest of system 10 (or to system 11 in the embedded configuration), or whether MFB 100 had been physically disconnected from the system, during the power outage. An illustrative example of a circuit 150 is disclosed in U.S. application Ser. No. 07/869,413 filed on Apr. 16, 1992, and assigned to the same assignee as this application. It is hereby incorporated herein by reference.

Control and network interface 201 couples system bus 211 to control link 13 and to data link 15. Control link 13 may be, for example, a DCIU protocol link, an SMSI protocol link, or an ASAI protocol link. Data link 15 of master MFB 100 is connected to an administrative console 17 to provide administration and maintenance access to MFB 100. Data link 15 of a slave MFB 101-102 may also be connected to a console, such as a secondary administrative console or a test terminal. However, interface 201 of a slave MFB 101-102 commonly provides a multi-MFB voice-mail system 10 with a voice-mail networking capability by means of link 15 to a voice-mail network 14 of other voice-mail systems. An alternative voice-mail networking capability is provided through TDM bus 103—either directly in the embedded configuration or through data port circuits 51 in the adjunct configuration (see FIG. 1)—a channel of which may be connected to voice-mail network 14 through switching system 11. Interface 201 preferably supports a plurality of protocols, both synchronous and asynchronous. Illustratively, links 13 and 15 are RS-232 links, and interface 201 comprises a pair of universal synchronous and asynchronous receivers and transmitters (USARTs).

LAN bus interface 200 couples system bus 211 to LAN bus 104, which provides a high-speed inter-MFB communication path for compressed voice, data, and control information. Illustratively, LAN bus 104 is the internal packet bus of the AT&T System 75 or Definity PBX, and LAN bus interface 200 conforms to the definition of System 75 or Definity packet-bus port circuit packs to support the embedded configuration. LAN bus 104 illustratively provides LAPD-protocol (ISO OSI level 2) connectivity.

LAN bus interface 200 is shown in greater detail in FIG. 3. Interface 200 includes a packet processing element (PPE) 300 and a LAPD controller 301. PPE 300 is connected to LAN bus 104 and to an angle bus 215. PPE 300 terminates the lower level of packet protocol on LAN bus 104. It is a circuit of conventional functionality, whose functions include handling of media (LAN bus) access (e.g., bus queuing and buffering), arbitration, low-level protocol packet processing, and packet data stream serial/parallel conversion. Via angel bus 215, PPE 300 is configured by TDM bus interface 204 for the particular protocol being used on LAN bus 104 and is assigned a unique LAN bus endpoint identifier. For purposes of port-board emulation, PPE 300 may also be connected to TDM bus interface 204 by a concentration highway 302, which duplicates concentration highway 213 and which provides a direct data-transfer capability between TDM bus 103 and LAN bus 104.

LAPD controller 301 is connected to PPE 300, and implements the LAPD link-layer protocol specified in CCITT recommendation Q.920/921 for both signalling and data transfer in ISDN configurations (i.e., when LAN bus 104 implements the ISDN protocol). It is connected to system bus 211 in order to perform DMA transfers of packets into and out of memory 205. Also, CPU 203 uses system bus 211 to program operational parameters into LAPD controller 301 that configures it to handle the particular packet protocol that is implemented on LAN bus 104.

Returning to FIG. 2, TDM bus interface 204 couples MFB 100 to TDM bus 103, and provides an interconnection between TDM bus 103, system bus 211, and a concentration highway 213. Illustratively, TDM bus 103 is a dual 256 time-slot parallel bus (for a total of 512 time slots), running at 2 Mbps, that implements a control channel, e.g., via the first five time slots of every frame. Illustratively, TDM bus 103 is the internal TDM bus of the AT&T System 75 or Definity PBX, and TDM bus interface 204 conforms to the definition of System 75 or Definity TDM-bus port circuit packs to support the embedded configuration. In the embedded configuration, or in a slave MFB in the adjunct configuration, TDM bus interface 204 operates under control of a system master, which is the control processor of switching system 11 in the embedded configuration and is the master MFB in the adjunct configuration. In the master MFB in the adjunct configuration, TDM bus interface 204 controls its own operation as well as all slaves' operations on TDM bus 103. TDM bus interface 204 also configures LAN bus interface 200 of its own MFB 100, for which purpose it is connected to interface 200 via angel bus 215. TDM bus interface 204 further controls the operation of DSPs 208-209, for which purpose it is connected to each one of DSPs 208-209 by one of a plurality of multilead control links 214.

TDM bus interface 204 is shown in greater detail in FIG. 4. TDM bus interface 204 includes circuits 400-405 interconnected by angel bus 215. Bus 215 is a conventional microprocessor bus. An arch/angel CPU 400 is a microprocessor, such as an Intel 8051, that controls the operation of TDM bus interface 204 by executing programs out of a static RAM (SRAM) 401. When MFB 100 is a master MFB in an adjunct voice-mail system 10 configuration, CPU 400 executes "archangel" functions; when MFB 100 is either a slave MFB in an adjunct configuration or is part of an embedded configuration, CPU 400 executes "angel" functions. More on this later.

Programs stored in SRAM 401 are downloaded into TDM bus interface 204 by CPU 203 through a dual port RAM (DPRAM) 402. DPRAM 402 is connected to system bus 211 and serves as a buffer, a mailbox, for communications between CPU 203 and CPU 400. Upon system reset, CPU 203 initially down-loads a boot program into DPRAM 402, and thereafter downloads a series of other programs into DPRAM 402 for execution by CPU 400. Upon thereset, CPU 400 begins to execute the boot program out of DPRAM 402. CPU 400 executes the boot program to transfer the other programs being downloaded by CPU 203 into DPRAM 402 from DPRAM 402 into SRAM 401. Thereafter, CPU 400 executes the programs from SRAM 401 and merely uses DPRAM 402 as a mailbox for further communications between itself and CPU 203.

A sanity and control interface (SAKI) 404 and a switch conferencer for TDM bus and concentration highway (SCOTCH) 403 handle communications with TDM bus 103. They or their functional equivalents are both conventional circuits which are included in every one of the conventional AT&T Definity or Systems 75 port circuits. SAKI 404 is responsible for extracting control information from TDM bus 103 which is destined for this MFB 100, and forwarding requests from this MFB 100 onto the control channel of TDM bus 103. SAKI 404 informs CPU 400 upon receipt of a message across TDM bus 103, and accepts a message for output to TDM bus 103 in response to notification from CPU 400. SCOTCH 403 is responsible for putting data onto and extracting data from TDM bus 103. It is a concentration/deconcentration device that interfaces multiple voice and/or data communication channels between concentration highway 213 and TDM bus 103. SCOTCH 403 receives multiple channels for concentration via concentration highway 213, and outputs deconcentrated channels onto concentration highway 213. Between them, SAKI 404 and SCOTCH 403 present to TDM bus 103 the same appearance as an AT&T Definity or System 75 port circuit.

Timeslot controller 405 is a cyclical clock-signal generation circuit of conventional construction, that drives DSPs 208-209 through control links 214. Each DSP 208-209 supports (processes) one or more communication channels, and timeslot controller 405 causes each DSP 208-209 to communicate over a unique pair of input and output time slots on concentration highway 213 for each one of the supported channels. Illustratively, timeslot controller 405 includes a programmable map that indicates for each channel of each DSP 208-209 the corresponding input and output timeslots, and it uses the contents of this map to send appropriately timed strobe signals to each DSP 208-209. CPU 400 initializes timeslot controller 405 at system initialization and reset illustratively by programming the map contents according to whatever functionality has been assigned to this MFB 100.

Returning to FIG. 2, off-line storage interface 207 couples system bus 211 to off-line storage 111 via a link 121. It provides MFB 100 with access to a plurality of storage devices, such as disks and tape, through a single interface. Illustratively, link 121 is the Small Computer Systems Interface (SCSI) bus, and interface 207 is a conventional SCSI controller.

Concentration highway 213 is a passive serial time-division-multiplexed bus. Via TDM bus 103, it provides access to the voiceband ports that are assigned to voice-mail system 10 on switching system 11. Illustratively, it supports 32 channels of full-duplex 64 Kbps data and associated control information for an aggregate bit rate of 2 Mbps. Each channel comprises 8 time slots in each repetitive frame on concentration highway 213.

Connected to concentration highway 213 is a plurality (e.g., six) digital signal processors (DSPs) 208-209. Each DSP 208-209 is assigned a fixed set of time-slots on concentration highway 213. The assignment is effected by TDM bus interface 204 through control links 214. DSPs 208-209 are also connected to a parallel I/O bus 212. DSPs 208-209 provide voice-processing functions required for voice-mail system functionality, such as voice compression and decompression. Operation of DSPs 208-209 is programmable; each runs out of its own downloadable external RAM 230. Illustratively, each DSP 208-209 is an AT&T DSP-32C. Each DSP 208-209 is programmed to provide the following functionality: signaling (e.g., tone detection and generation), signal power-level control (e.g., automatic gain control, volume control), speech coding (e.g., encoding, decoding, silence compression, noise fill, and packet assembly and disassembly of compressed speech waveform data), speech processing (e.g., speed-up or slow-down, volume control), speech generation and recognition (e.g., speech-to-control and text-to-speech conversion), voiceband data processing (for voiceband-modem networking and facsimile), and digital data processing (for networking protocol termination).

I/O DMA controller 206 provides direct-memory access by DSPs 208-209 to memory 205. It interfaces system bus 211 to parallel I/O bus 212. It supports data buffer, control, and DSP control-program downloading with minimal overhead. I/O DMA controller 206 has the following characteristics: handles buffer pointers for as many channels as are supported by I/O devices 208-209 (e.g., 32 channels); interfaces to a parallel I/O bus 212; handles interrupts from I/O devices 208-209; supports a control channel simultaneously with data transfers; and supports a pass-through mode that allows CPU 203 to directly write registers of I/O devices 208-209.

Illustratively, I/O DMA controller 206 is implemented with a RAM-programmable XILINX XC3090™ gate array. The implementation is characterized by the state diagram of FIG. 5. Upon system power-up, in mode 500, controller 206 makes a transition 501 into a program mode 502. In program mode 502, CPU 203 downloads a program into controller 206. CPU 203 then causes controller 206 to commence execution of the downloaded program and thereby make a transition 503 into idle pass-through mode 504. Illustratively CPU 203 causes the program execution to commence by clearing a control bit of controller 206; subsequent resetting of this bit causes controller 206 to make a transition 505 back to program mode 502.

In idle pass-through mode 504, controller 206 responds to predetermined addresses generated on system bus 211 by CPU 203 by interconnecting the system bus 211 with I/O bus 212 to provide CPU 203 with direct access to DSPs 208-209.

In response to receipt of a command from CPU 203, controller 206 makes a transition 506 to polling pass-through mode 507. Illustratively, CPU 203 issues the command by writing a control register of controller 206; canceling the command by re-writing the control register causes controller 206 to make a transition 508 back to mode 504. In mode 507, controller 206 performs the pass-through activities described for mode 504, but in addition it polls DSPs 208-209 for work requests, illustratively by examining their work-request flags (e.g., contents of PIR register of the AT&T DSP-32C). Upon receiving a work request from a DSP 208-209, controller 206 makes a transition 509 into bus request pass-through mode 510. In mode 510, controller 206 performs the pass-through activities described for mode 504, but in addition it makes a request to bus DMA controller 210 for access to system bus 211.

Upon receipt of an access grant from controller 210, controller 206 makes a transition 511 to master mode 512, wherein it asserts mastery over system bus 211 and executes the work request that it received from a DSP 208-209. Illustratively, in the case of the AT&T DSP-32C, the requested work is specified by contents of the DSP's PIR register. If controller 206 either fails to complete execution of the work within a predetermined period of time or loss the access grant while it is executing the work, it relinquishes mastership of bus 211 and makes a transition 513 back to mode 510. Conversely, if controller 206 successfully completes the requested work, it then relinquishes mastership of bus 211 and makes a transition 514 back to mode 507.

Figure 6:
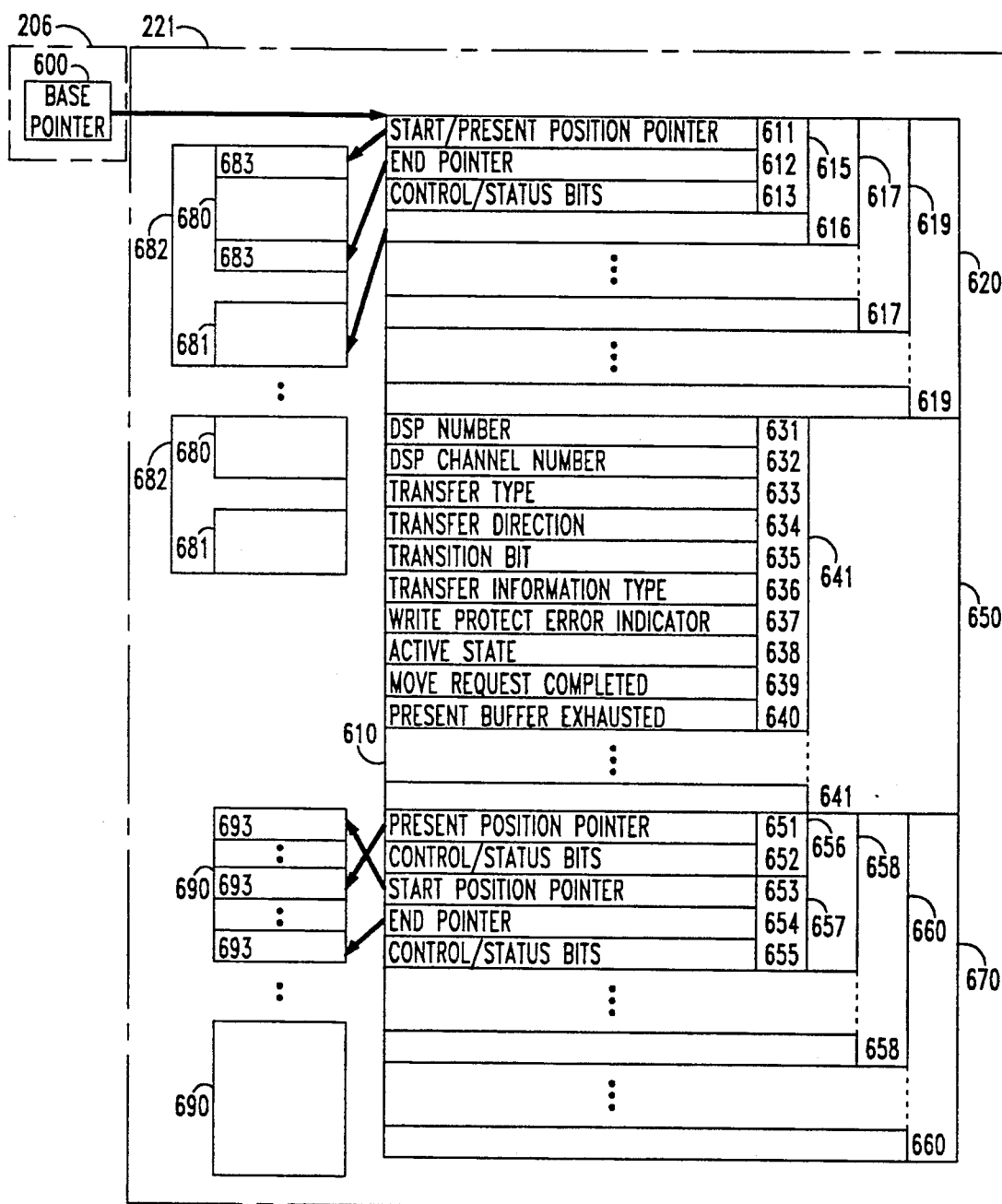
FIG. 6 is a block diagram of data structures of the I/O DMA controller of the MFB of FIG. 2.

FIG. 6 illustrates the data structures through which controller 206 accomplishes work execution in master mode 512. Controller 206 includes a base pointer 600 which points to the beginning of a pointer block area 610 in DRAM 221 of memory 205. Pointer block area 610 has three parts: a data buffer pointers part 620, a circular interrupt FIFO data part 650, and a control buffer pointers part 670.

Data buffer pointers part 620 includes a plurality of entries 615 and 616, each one of which points to a different data buffer 680 or 681 in DRAM 221. Each entry 615 and 616 includes a start/present position pointer 611 that points to a beginning entry 683 of a data buffer 680 or 681 prior to commencement of use of that buffer 680 or 681, and points to a presently-used entry 683 of that data buffer 680 or 681 during use of that buffer 680 or 681. Each entry 615 and 616 further includes an end pointer 612 to a last entry 683 of the corresponding data buffer 680 or 681, and control and status bits 613 which indicate whether the corresponding data buffer 680 or 681 is in use, whether it is available, and whether writing of that data buffer 680 or 681 has been successful.

Pairs 682 of data buffers 680 and 681 are used in a ping-pong configuration: while a ping data buffer 680 of a pair 682 is used by controller 206, a pong data buffer 681 of a pair 682 is idle or available for use by CPU 203; when controller 206 exhausts use of ping data buffer 680, it notifies CPU 203 and switches to use of pong data buffer 681, whereby ping data buffer 680 becomes idle or available for use by CPU 203; and so on. There is a pair 617 of entries 615 and 616 which point to data buffers 680 and 681 of a single pair 682 for each channel supported by a DSP 208-209, and a set 619 of pairs 617 for each DSP 208-209.

Circular interrupt FIFO data part 650 has plurality of entries 641 that form a circular FIFO buffer and each one of which is used by CPU 203 and controller 206 to convey to each other information about ping and pong buffer pairs 682 following issuance of a type of interrupt (INT1) by controller 206 to CPU 203. Each entry 641 has a plurality of information fields 631-640. DSP number field 631 identifies the one of the DSPs 208-209 to which this entry 641 relates. DSP channel number field 632 identifies the one of the channels supported by the DSP identified in field 631 to which this entry 641 relates. Transfer type field 633 indicates whether the identified channel's corresponding buffer pair 682 is presently being used to serve a command issued by CPU 203 or a request issued by the corresponding DSP 208-209. Transfer direction field 634 indicates whether the transfer is from DSP 208-209 to memory 205 or vice versa. Transition bit field 635 indicates whether controller 206 is presently using ping data buffer 680 or pong data buffer 681 of the corresponding pair 682. Transfer information type field 636 indicates whether the information that is being transferred is data or control. Write protect error indicator field 637 indicates whether a work request violated the declared use of a transfer buffer. Active state field 638 indicates whether the corresponding buffer pair 682 is designated as active or idle. Move request completed field 639 indicates whether the requisite information transfer has been fully or only partially completed. And present buffer exhausted field 640 indicates whether or not controller 206 has completed its use of the one buffer 680 or 681 of the corresponding pair 682 that it is indicated by field 635 to be presently using.

Control buffer pointers part 670 includes a plurality of entries 656 and 657, each pair 658 of which points to a different circular control buffer 690 in DRAM 221. Uplink pointer entry 656 includes a present position pointer 651 that points to a presently-used entry 693 of a control buffer 690, and control and status bits 652 which indicate whether the corresponding control buffer 690 is in use, whether it is available, and whether writing of that control buffer 690 has been successful, all for information transfers from controller 206 to CPU 203. The corresponding downlink pointer entry 657 includes a start position pointer 653 that points to a first entry 693 of the corresponding control buffer 690, an end pointer 654 that points to a last entry 693 of that control buffer 690, and control status bits 655 which indicate whether that control buffer 690 is in use, whether it is available, and whether writing that control buffer 690 has been successful, all for information transfers from CPU 203 to controller 206. Analogously to part 620, part 670 includes a pair 658 of entries 656 and 657 for each channel supported by a DSP 208-209, and a set 660 of pairs 658 for each DSP 208-209.

I/O DMA controller 206 provides the following functionality: it transfers voice waveform data and packetized or nonpacketized networking data between a DSP 208-209 and a memory 205 data buffer; it transfers control information between a DSP 208-209 and a memory 205 command buffer; it enables CPU 203 to become the master of I/O bus 212 in order to write commands directly into each DSP 208-209 and to manipulate DSPs' registers; it collects status and interrupt signals from I/O bus 212 and presents them to CPU 203; and it serves to download programs from memory 205 into DSPs 208-209. This functionality is realized using the following types of transfers.

Fixed Length Downlink (FLD) is a one-word control-information transfer directly from CPU 203 down to a register (PDR2) of a DSP 208-209 using pass-through mode. Controller 206 generates an interrupt (PDR2INT) to the DSP to notify the DSP that a message has been written into its register. At the same time, controller 206 returns a "ready" signal to CPU 203 to terminate the pass-through bus cycle.

Fixed Length Uplink (FLU) is a one-word control-information transfer from a DSP 208-209 up to CPU 203 using master mode. Controller 206 transfers the command word into the correct control buffer of CPU 203 and then interrupts CPU 203 (INT2).

Variable Length Downlink (VLD) is a control-buffer transfer from CPU 203 down to a DSP 208-209 using master mode. Upon request from a DSP 208-209, if there is downlink control information available, controller 206 moves it into the specified DSP buffer. The DSP is updated with the actual transferred word count at the end of the request.

Variable Length Uplink (VLU) is a control-buffer transfer up to CPU 203 from a DSP 208-209 using master mode. Upon request from a DSP 208-209, controller 206 transfers contents of the specified DSP buffer into the correct uplink command buffer of CPU 203 and interrupts CPU 203 (INT2). The DSP is updated with the actual transferred word count at the end of the request.

DaTa Downlink (DTD) is a full or a partial data-buffer transfer from CPU 203 down to a DSP 208-209 using master mode. Upon request from a DSP 208-209, controller 206 searches to find to correct ping or pong buffer of CPU 203, and then, if possible, transfers the data into the specified DSP buffer. If a ping or pong buffer of CPU 203 is exhausted during the transfer, controller 206 smoothly transitions to the other buffer and attempts to complete the request. Alternatively, if the first buffer is exhausted, a control bit (PIR6) allows the DSP to have controller 206 terminate the request and set up—but not use—the other buffer. In a similar fashion, if a CPU 203 buffer is exhausted and it is an odd number of bytes long, controller 206 terminates the request and sets up the other buffer. If a CPU 203 buffer is exhausted while servicing the DSP's request, controller 206 interrupts CPU 203 (INT1). If there is no CPU 203 buffer marked "in-use" during the search to satisfy the DSP's request, controller 206 interrupts CPU 203 (INT3). The DSP 208-209 is updated with the actual transferred word count and "CPU 203 exhausted" status at the end of the request.

DaTa Uplink (DTU) is a full or a partial data-buffer transfer up to CPU 203 from a DSP 208-209 using master mode. Upon request from a DSP 208-209, controller 206 searches to find the correct ping or pong buffer of CPU 203, and then, if possible, transfers the contents of the specified DSP buffer up to CPU 203. If a CPU 203 buffer is exhausted during the transfer, controller 206 smoothly transitions to the other buffer and attempts to complete the request. A control bit (PIR6) allows the DSP to have controller 206 terminate the request at the end of either the CPU 203 or the DSP buffer and set up—but not use—the other buffer. In a similar fashion, if the DSP buffer is exhausted and it is an odd number of bytes long, controller 206 automatically terminates the request and sets up the other buffer. If a CPU 203 buffer is exhausted while servicing the DSP's request, controller 206 interrupts CPU 203 (INT1). If there is no CPU 203 buffer marked "in-use" during the search to satisfy the DSP's request, or if an "in-use" and "available" buffer is write-protected, controller 206 interrupts CPU 203 (INT3). The DSP is updated with the actual transferred word count and "CPU 203 exhausted" status at the end of the request.

For all information transfers, controller 206 accesses and updates pointer information in CPU 203 and DSP 208-209 memories as required.

A reset of MFB 100 is initiated upon power-up, in response to receipt of a reset command from administrative console 17, or by maintenance functions as part of a fault-recovery strategy. In the latter two cases, the cause for the reset is recorded by CPU 203 in RAM 202 prior to the reset being performed. Illustratively, if the reset is initiated by receipt of a reset command from console 17, CPU 203 sets a reset-reason indicator in RAM 222 to a predetermined value; if the rest is caused by a maintenance function, CPU 203 merely increments the present value of the reset-reason indicator to escalate the severity of the reset. In all cases, the reset causes CPU 203 to execute the firmware of FIGS. 7 et seq. to which attention is now directed.

Figure 7:
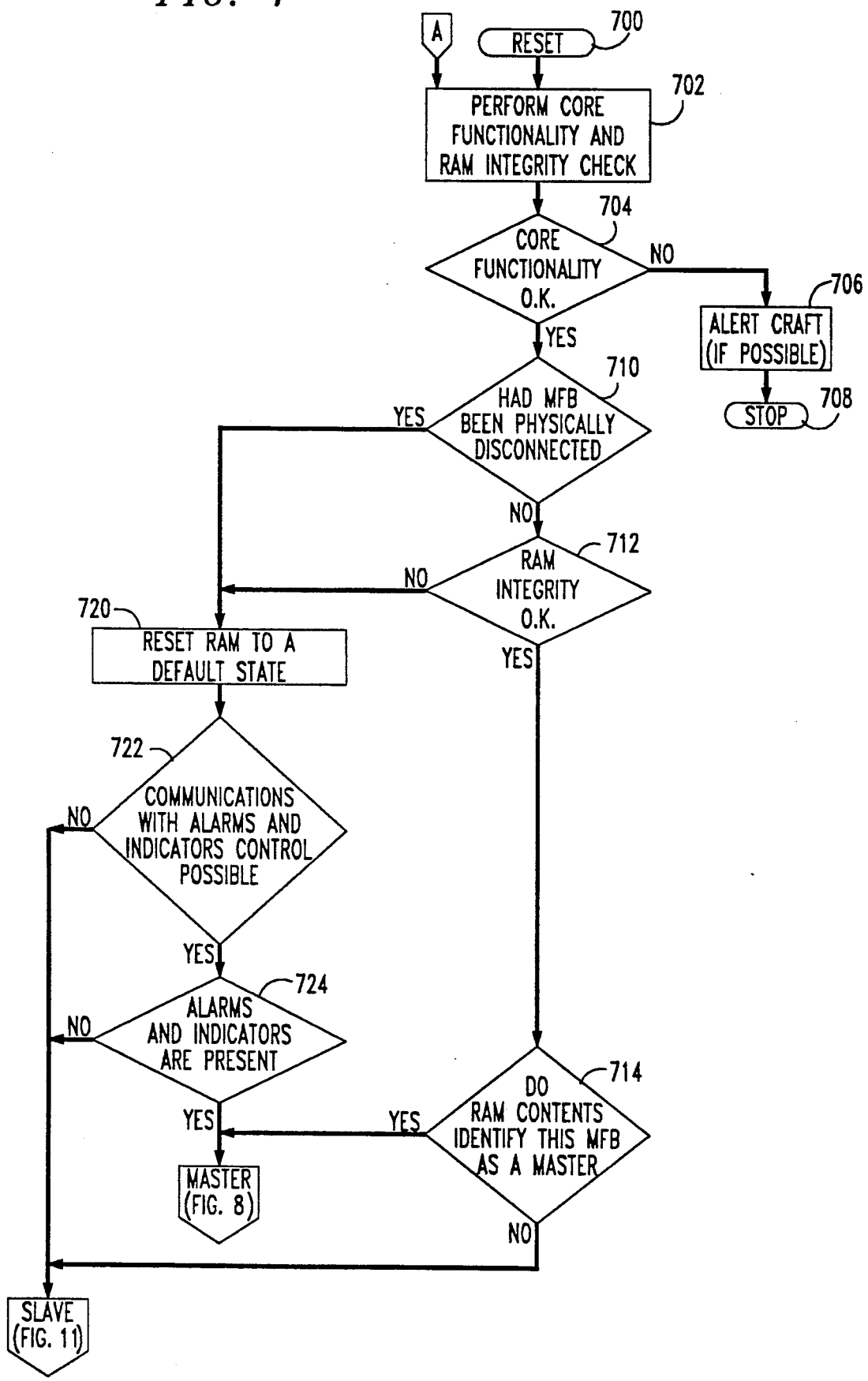
FIGS. 7-10 are functional flow diagrams of the firmware of the CPU of a master MFB of FIG. 1.

As shown in FIG. 7, upon occurrence of the reset, at step 700, the firmware performs a test of the core functionality of MFB 100, and of RAM 222 integrity, at step 702. This test involves checking whether CPU 205 is capable of executing programs, whether memory 205 can be accessed and is functional, and whether communication with alarms and indicators control 202 is possible.

If the test of core functionality fails, as determined at step 704, MFB 100 is not functional, and so the firmware attempts, if possible, to alert the craft via alarms and indicators control 202, at step 706, and then stops, at step 708.

If the test of core functionality passes, as determined at step 704, the firmware checks the output of "I've been pulled" circuit 150 of alarms and indicators control 202 to determine whether MFB 100 had been physically disconnected from its carrier, at step 710. If circuit 150 indicates that MFB 100 had not been disconnected, the firmware checks the result of the RAM integrity test that was performed at step 702, at step 712. If the RAM integrity test passed, the firmware checks the contents of a particular location in RAM 222, at step 714, to determine whether they identify this MFB as a master or a slave. Depending upon the result of this check, the firmware executes either a master reset procedure (MASTER), shown in FIGS. 8-10, or a slave reset procedure (SLAVE), shown in FIGS. 9-13.

Returning to steps 710 and 712, if either circuit 150 indicates at step 710 that MFB 100 had been physically disconnected, or the RAM integrity test is found at step 712 to have failed, the firmware resets the contents of RAM 222 to a predetermined default state, at step 720. The firmware then interacts with alarms and indicators control 202 to determine whether communication with alarms and indicators 112 is possible, at step 722, and if alarms and indicators 112 are in fact present, at step 724. If the answers to both determinations are affirmative, this MFB is assumed to be a master MFB 100, and so the firmware proceeds to execute the master reset procedure of FIGS. 8-10. But if either determination of steps 722 and 724 produces a negative answer, this MFB is assumed to be a slave MFB 101-102, and so the firmware proceeds to execute the slave reset procedure of FIGS. 11-13.

Figure 8:
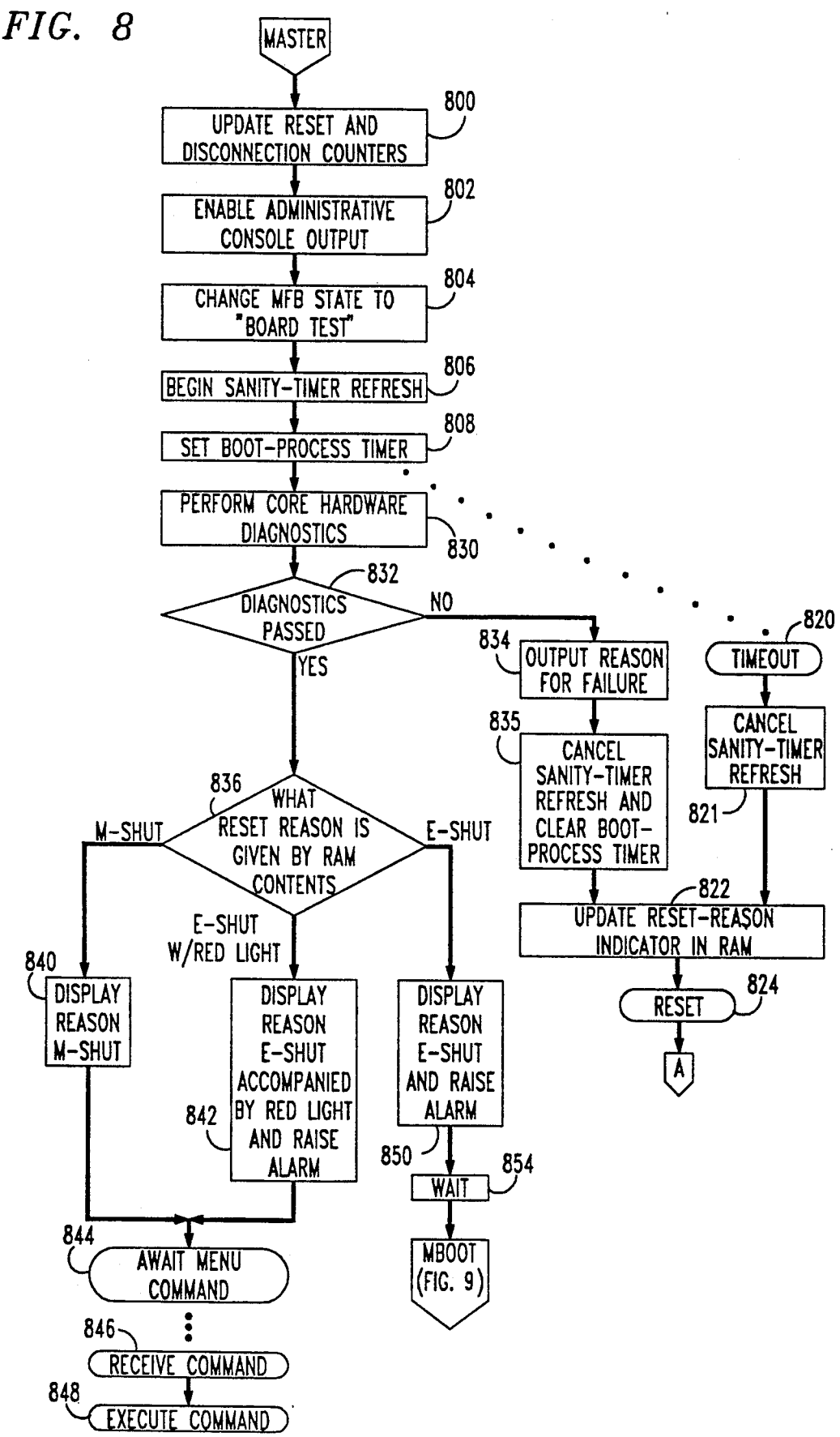

Turning to the master reset procedure of FIG. 8, the firmware now updates counters (not shown) that keep track of how many times MFB 100 has been reset and how many times it has been physically disconnected from its carrier, at step 800. The firmware then sets up and enables control and network interface 201 to communicate across data link 15 in a manner suitable for communicating with an administrative console 17, at step 802. The firmware next causes alarms and indicators control 202 to change the state of MFB 100 that is indicated both on MFB 100 and on alarms and indicators 112 to "board test" state, at step 804. The firmware also enables and begins to refresh an MFB 100 sanity timer (not shown), at step 806, and sets a timer (not shown) that times a maximum allowed time period for execution of a boot process—illustratively 10 minutes—at step 808. If the boot-process timer times out, at step 820, prior to being reset at step 949 of FIG. 10 following execution of the boot process, the firmware cancels the sanity-timer refresh that was begun at step 806, at step 821, increments in RAM 222 the previously-mentioned reset-reason indicator to escalate the severity of the reset, at step 822, and then initiates a reset, at step 824. The reset causes firmware to return to step 700 of FIG. 7.

Following step 808, the firmware runs MFB 100 hardware diagnostics, at step 830, principally to determine whether CPU 203 has sufficient sanity to test and run peripherals. If the hardware does not pass the diagnostics, as determined at step 832, the firmware outputs, through alarm and indicators control 202, the reason for the failure, at step 834. It then cancels sanity timer refresh as in step 821 and clears the boot-process timer that it had set at step 808, at step 835. The firmware then proceeds to steps 822 et seq. to repeat the reset at an escalated level.

If the hardware passes the diagnostics, as determined at step 832, the firmware examines the value of the previously-mentioned reset-reason indicator in RAM 222 to determine, at step 836, what reason is given for the present reset. If the reset-reason indicator gives a value of "maintenance shutdown" (M_SHUT) as the reason for the reset, meaning that the reset was initiated by a command received from administrative console 17, the firmware causes alarms and indicators control 202 to indicate the reason as being M_SHUT on alarms and indicators 112, at step 840. If the reset-reason indicator gives a value of "error shutdown accompanied by a red light" (E_SHUT W/RED LIGHT) as the reason for the reset, meaning that the reset was initiated by a reset-level escalation caused by occurrence of an error (e.g., failure of hardware diagnostics or timeout of the boot-process timer; see step 822), the firmware causes alarms and indicators control 202 to indicate the reason as being E-SHUT and to turn on an accompanying red warning light and also to activate an alarm on alarms and indicators 112, at step 842.

Following either step 840 or step 842, the firmware stays further execution and awaits input of a selection from a menu of possible commands from administrative console 17, at step 844. The menu of available commands is: display initialization history, display MFB 100 status, perform a memory read or a memory write function, perform additional tests, activate automatic booting, preempt automatic booting, initiate manual booting, execute selected MFB 100 functional commands, or stop and initiate automatic booting. Upon receipt of one of these commands from console 17, at step 846, the firmware proceeds to execute the received command, at step 848.

Returning to step 836, if the reset-reason indicator gives a value of "error shutdown" (E-SHUT) as the reason for the reset, meaning that the reset is the lowest-level reset initiated by the occurrence of an error, the firmware causes alarms and indicators control 202 to indicate the reason as being E-SHUT and to raise an alarm on alarms and indicators 112, at step 850. The firmware then waits a predetermined period of time, at step 854, to give craftspersons a chance to respond to the alarm that was raised at step 850, and then proceeds to boot the master MFB 100.

Figure 9:
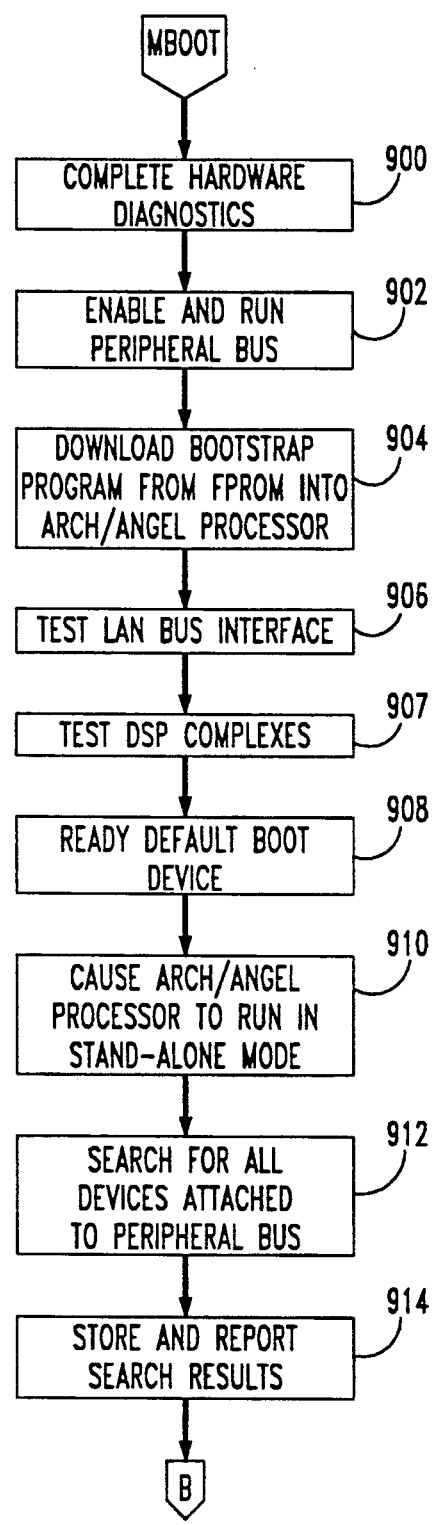
Figure 10:
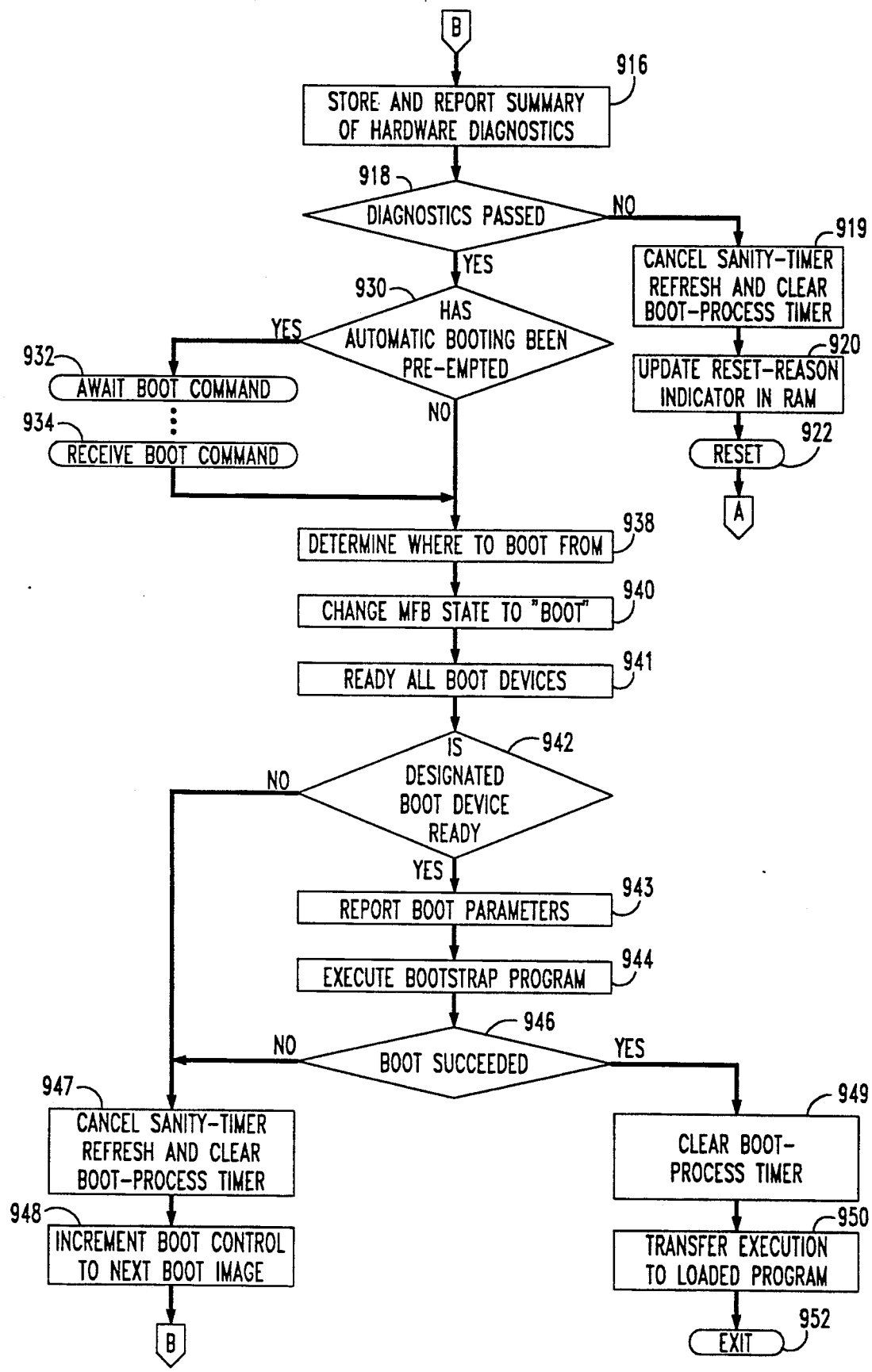

The master boot (MBOOT) procedure is shown in FIGS. 9-10. The firmware first completes all MFB 100 hardware diagnostics, at step 900. It then enables and runs peripheral bus 121, at step 902. The firmware then downloads a bootstrap program from FPROM 220 into arch/angel processor 400 of TDM bus interface 204, at step 904. The firmware also tests LAN bus 104 via LAN bus interface 200 to ensure that it is operational, at step 906, and also tests the DSP complexes 208-209 in like manner, at step 907. The firmware then readies a default boot device from which MFB 100 will be booted, at step 908. Illustratively, this involves spinning up a disk-drive 0 of off-line storage 111. The firmware then causes arch/angel processor 400 to run in stand-alone mode, at step 910. From this point on, arch/angel processor 400 will respond to sanity scans made over TDM bus 103 by, e.g., switching system 11. .The firmware then conducts a search for all devices that are attached to peripheral bus 121, at step 912, and hands the results of the search over to alarms and indicators control 202, which stores the information in registers that are available on a shared basis to CPU 203 and also reports the search results to administrative console 17, at step 914. The firmware also hands over a summary of the results of the hardware diagnostics that were executed at steps 830 and 900 to alarms and indicators control 202, which likewise stores the information in shared registers and reports it to administrative console 17, at step 916. The firmware then checks whether the hardware diagnostics that were executed at step 900 passed, at step 918. If the hardware diagnostics failed, the firmware cancels the sanity-timer refresh that was started at step 806 and clears the boot-process timer that was set at step 808, at step 919, increments in RAM 222 the previously-mentioned reset-reason indicator to escalate the severity of the reset, at step 920, and then initiates a reset, at step 922. The reset causes firmware to return to step 700 of FIG. 7.

Returning to step 918, if the hardware diagnostics passed, the firmware checks whether automatic booting has been pre-empted, at step 930. This involves determining whether a command-selection received at step 846 of a previous iteration of the reset procedure was to pre-empt automatic booting. If automatic booting has been pre-empted, the firmware waits for receipt of a boot command, e.g., from console 17, at step 932. Upon receipt of the boot command, at step 934, or if automatic booting is not found at step 930 to have been pre-empted, the firmware proceeds to determine where to boot from, at step 938. In the case of an automatic boot (NO leg of step 930), booting will initially be attempted from a partition of a primary boot device that is designated as being an active partition. In the case of a manual boot (YES leg of step 930), booting will initially be attempted from whatever partition of the primary boot device was specified by the boot command received at step 934. The firmware then causes alarms and indicators control 202 to change the state of MFB 100 that is indicated both on MFB 100 and on alarms and indicators 112 to "boot" state, at step 940. The firmware then readies all boot devices on peripheral bus 121, at step 941, and checks whether the boot device that was identified at step 938 succeeded in becoming readied, at step 942. If not, the firmware cancels the sanity-timer refresh that was started at step 806 and clears the boot-process timer that was set at step 808, at step 947, and then increments a boot control parameter that is used at step 938 to identify the next successive image from which booting should be attempted, at step 948. The progression first cycles through boot images of the primary boot device (e.g. disk) and then cycles through boot images of one or more secondary boot devices (e.g., another disk or tape). Following step 948, the firmware returns to step 916.

Returning to step 942, if the designated boot device succeeded in becoming ready, the firmware passes boot parameters, such as identity of the boot device and image that will be used for booting, to control and network interface 201, which reports them to administrative console 17, at step 943. The firmware then causes CPU 203 to execute the bootstrap program that is stored in FPROM 220, at step 944. Execution of the bootstrap program boots—loads—the contents of the image from the device that was identified in step 938 into DRAM 221. Following execution of the bootstrap program, control returns to the firmware, and it checks whether the boot succeeded, at step 946. Illustratively, this involves computation of a checksum over the loaded image and checking of the loading address and the starting address. If the boot failed, the firmware again proceeds to steps 947 and 948 to cancel the sanity-timer refresh, clear the boot-process timer, and increment the above-mentioned boot-control parameter that is used at step 938 to identify the next successive image from which booting should be attempted, and then returns to step 916. If the boot succeeded, the firmware clears the boot-process timer that was set at step 808, at step 949, and then transfers execution to the booted—loaded—program, at step 950, which promptly begins to execute. At this point, firmware loses control of the system and exits, at step 907.

Figure 11:
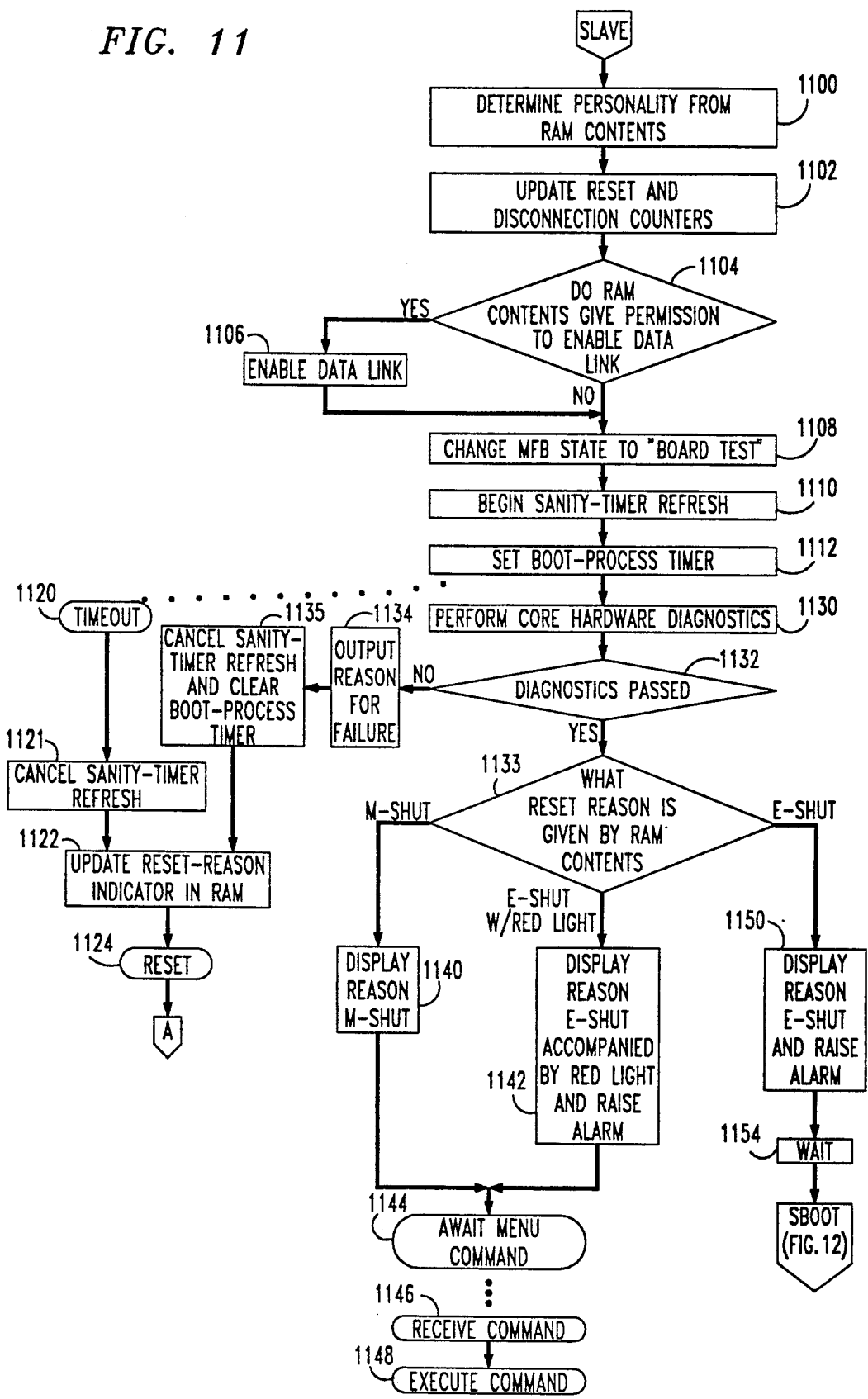
Figure 12:
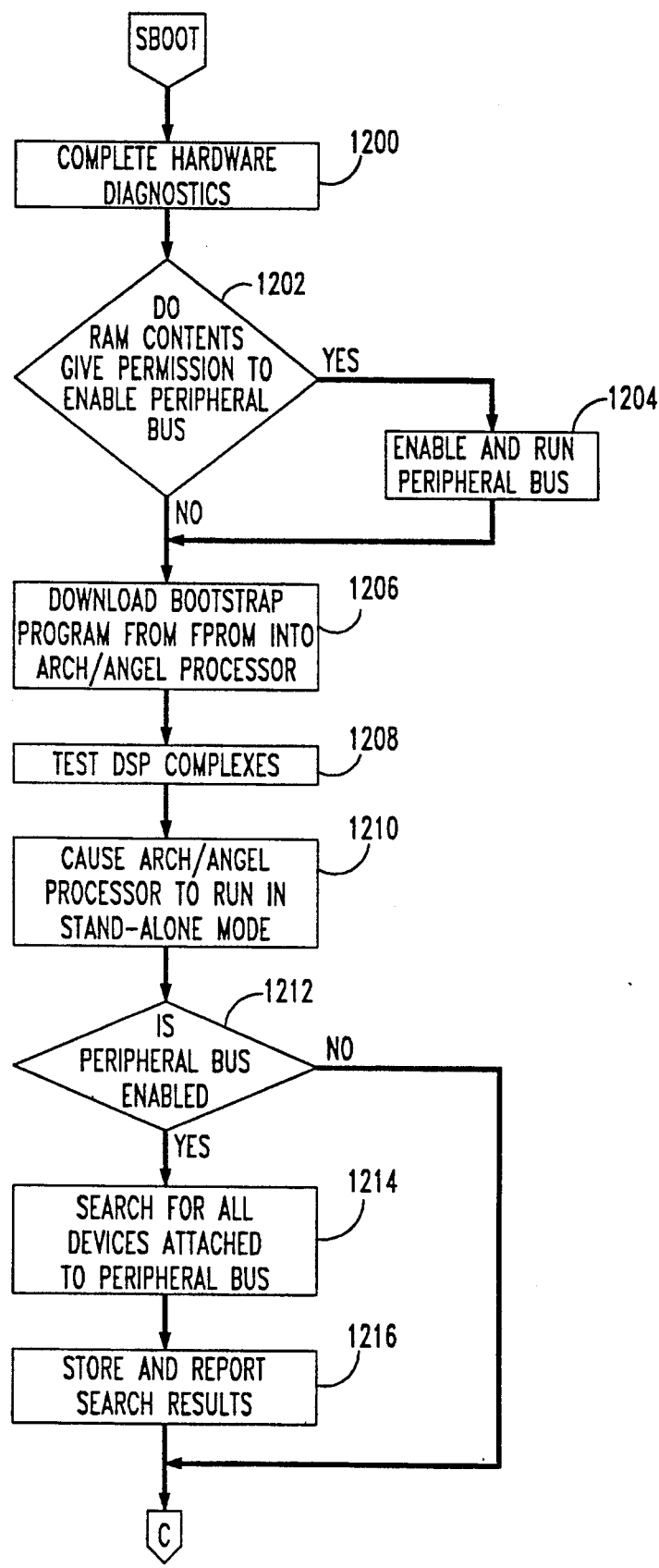
Figure 13:
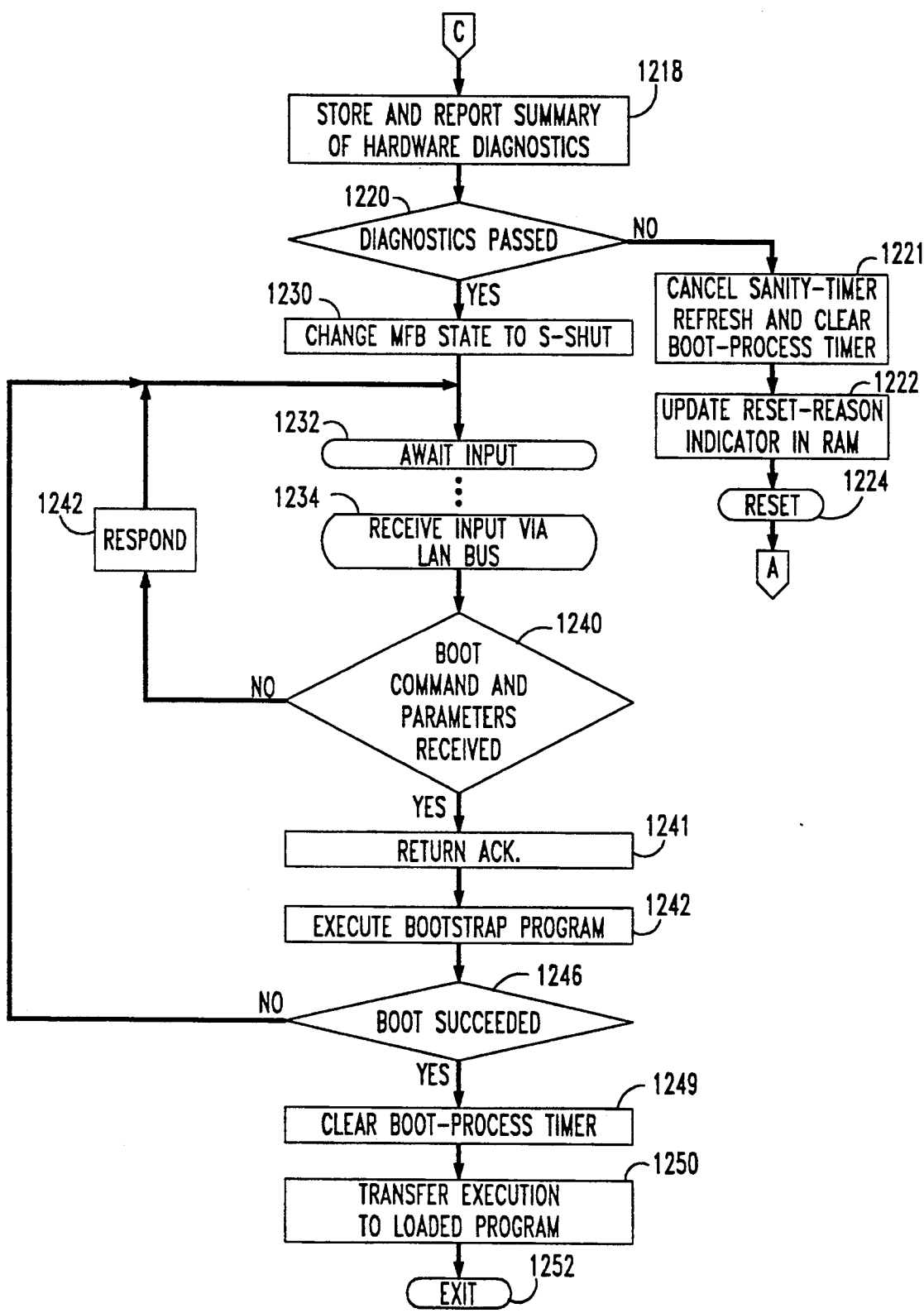

The slave reset procedure, shown in FIGS. 11-13, closely parallels the master reset procedure of FIGS. 8-10, with some exceptions. Only the exceptions will be discussed here.

The firmware commences the procedure by examining RAM 222 contents to determine what "personality" i.e., functional configuration, if any, this MFB is assigned, at step 1100. After updating the reset and disconnection counters, at step 1102, the firmware checks again the contents of RAM 222, for permission to enable data link 15, at step 1104. If such permission is found, the firmware enables data link 15, at step 1106. Subsequent steps 1108-1154 replicate steps 804-854, respectively, of FIG. 8.

Upon entering the slave boot (SBOOT) procedure of FIGS. 12-13 and completing hardware diagnostics, at step 1200, the firmware again checks the contents of RAM 222, this time looking for "permission" to enable peripheral bus 121, at step 1202. If such permission is found, the firmware enables peripheral bus 121, as step 1204. Next, at steps 1206, 1208, and 1210, the firmware duplicates the activities of steps 904, 907, and 910, respectively, of FIG. 9. The firmware then checks, at step 1212, whether it had enabled peripheral bus 121 at steps 1202-1204, and performs steps 1214 and 1216 which duplicate steps 912 and 914 of FIG. 9 only if bus 121 had been enabled. The subsequent steps 1218-1224 of FIG. 13 duplicate steps 916-922, respectively, of FIG. 10.

If it finds at step 1220 that hardware diagnostics have passed, the firmware causes alarms and indicators control 202 to change the state of the MFB that is indicated both on the MFB and on alarms and indicators 112 to S_SHUT state, at step 1230. In this state, the MFB is idle and waiting for receipt of a boot command across LAN bus 104 from master MFB 100. While waiting, it is responsive to all queries and commands received via LAN bus 104. Accordingly, the firmware waits to be informed by LAN bus interface 200 of receipt of input over LAN bus 104, at step 1232. Upon receipt of such input, at step 1234, the firmware determines if it is the awaited boot command and boot parameters, such as identity of a LAN bus 104 channel that it should use as the boot device, at step 1240. If it is not the boot command, the firmware responds to the input 1242 as necessary to satisfy the input, at step 1242, and then returns to step 1232.

Upon determining, at step 1240, that it has received the boot command, the firmware returns an acknowledgment to master MFB 100, at step 1241, and then causes CPU 103 to execute the bootstrap program from FPROM 220 and to use the received parameters in its execution, at step 1242. Following execution of the bootstrap program, control returns to the firmware, and it checks whether the boot succeeded, at step 1246 analogously to step 946 of FIG. 10. If the boot succeeded, the firmware performs steps 1249-1252 which duplicate the steps 949-952 of FIG. 10. If the boot failed, however, the firmware returns to step 1232.

Figure 14:
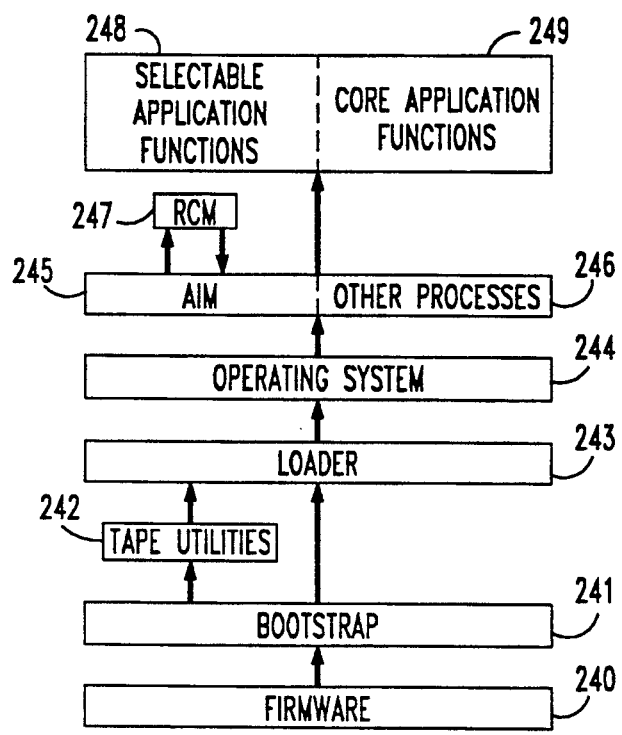
FIG. 14 is a sequence diagram of the functional hierarchy of programs of the master MFB of FIG. 1.
Figure 15:
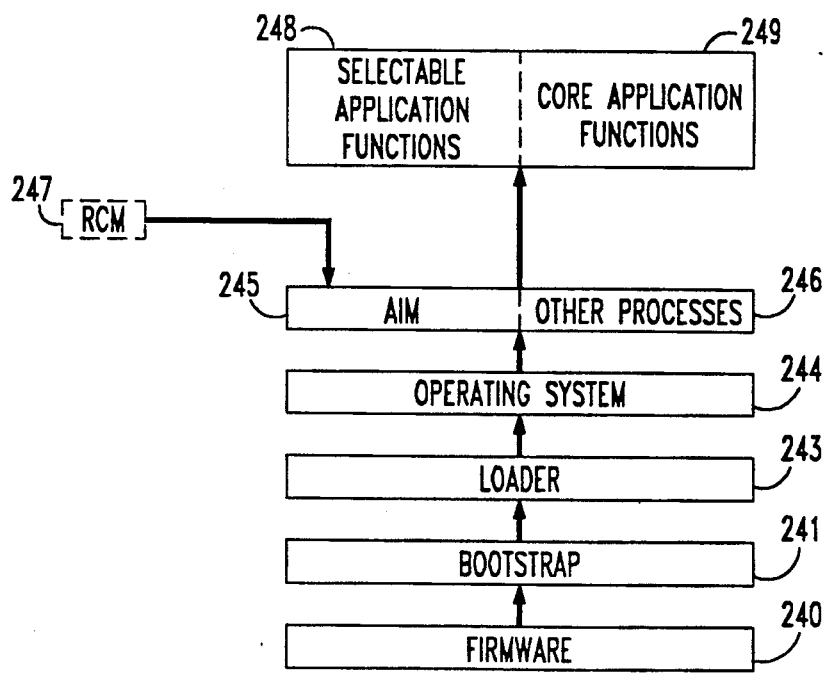
FIG. 15 is a sequence diagram of the functional hierarchy of programs of the slave MFB of FIG. 1.

FIGS. 14 and 15 show the sequence of the functional hierarchy of programs that are executed by master MFB 100 and slave MFBs 101-102, respectively. As was just explained in conjunction with FIGS. 7-13, the first program to be executed following reset is the firmware 240 program. Firmware 240 in turn causes execution of a bootstrap program 241 at step 944 of FIG. 10 or step 1242 of FIG. 13. The program that was loaded by the execution of bootstrap program 241 and that begins to execute at step 950 or 1250 is either a set of stand-alone tape utilities 242 or a loader 243 in the case of master MFB 100, and is loader 243 in the case of a slave MFB 101-102. Loader 243 directly loads a copy of an operating system 244, such as the UNIX ® operating system, into DRAM 221. Tape utilities 242 first condition a tape from which a copy of operating systems 244 will be loaded, and then load loader 243 which will in turn load operating system 244.

Under control of operating system 244, MFBs 100-102 constitute a networked computer application. Operating system 244 of each of the MFBs in turn loads the application programs 245-246 into the MFB. The init. table of each MFB's copy of operating system 244 identifies processes 245-246 that are to start running on that MFB. These include an AIM process 245, which loads into each MFB the core application functionality processes 249 that must execute on each MFB. The core processes 249 include processes for the control of databases and attendant off-line storage control devices. In master MFB 100, the AIM process loads an additional process, RCM 247, which carries with it information identifying which selectable functionality processes 248 are to be loaded into which MFBs. Selectable functionality processes 248 include voice-ports control and analog and digital networking ports control. The hardware, in turn, illustratively provides the following application support functions:

Speech Encoder/Decoder
Wide-band Speech Encoder/Decoder
Speech Encryption/Decryption
Text-to-Speech
Time Scale Modification
Speech Recognition
Speech Enhancement
Analog Modem Pool
Digital Modem Pool
Fractional T1-port
FAX Server
In-Band Signaling
Intrusive Impairment Analyzer
Non-Intrusive Impairment Analyzer
Traffic Analyzer RCM 247 communicates with the AIM processes 245 of all MFBs 100-102 (via LAN bus 104 with AIM processes 245 of MFBs 101-102) and directs each one of them to load the designed processes 248 into the corresponding MFBs. Hence, system, 10 may be reconfigured, and functions may be reassigned among MFBs 100-102, merely by changing the information carried by RCM 247. When programs 248 identified by RCM 247 are loaded into the appropriate MFBs and begin to execute, system 10 begins to function as an appropriately-configured adjunct processor, e.g., a voice-mail system.

Of course, it should be understood that various changes and modifications to the illustrative embodiment described above will be apparent to those skilled in the art. Such changes and modifications can be made without departing from spirit and the scope of the invention and without diminishing its attendant advantages. It is therefore intended that all such changes and modifications be covered by the following claims.

I claim:

1. An adjunct processor for performing adjunct-processing application functions for a telecommunications system, comprising:
   a set of a plurality of multi-function modules for together performing a set of adjunct-processing application functions, each module of the set of modules including all hardware needed to perform all of the functions of the set of functions and initially not being in possession of programs needed to be able to perform the functions of the set of functions but, under direction of one module of the set of modules that is designated a master module, obtaining the programs needed to become able to perform any one or more functions of the set of functions, all of the modules of the set modules being interchangeable;
   the master module including means for specifying to each individual module of the set of modules the one or more functions of the set of functions that the individual module is to become able to perform; and
   each individual module of the set of modules including means responsive to the specifying means for obtaining the programs needed to become able to perform the specified one or more functions.

2. The arrangement of claim 1 wherein all of the modules of the set of modules are physically identical.

3. The arrangements of claim 2 wherein
   all of the modules of the set of modules are programmable and wherein each of the specifying means and the obtaining means comprise a program.

4. The arrangements of claim 1 wherein
   the set of functions comprises communications-processing functions.

5. The arrangement of claim 1 wherein
   the set of functions comprises voice-mail functions.

6. The arrangement of claim 4 wherein
   each individual module of the set of modules comprises:
   a first communications interface for communicating with other modules of the set of modules;
   a memory for storing information defining communications-processing functions of the set of functions that are to be performed by the individual module;
   a second communications interface for at least one of receiving communications to be processed and transmitting processed communications;
   at least one digital signal processor coupled to the second communications interface for performing some of the functions defined by the contents of the memory on the communications;
   a central processing unit coupled to the first communications interface, the memory, and the at least one digital signal processor, for performing others of the functions defined by the contents of the memory; and
   the obtaining means, comprising means for loading into the memory the information defining the communications-processing functions specified by the specifying means of the master module.

7. The arrangement of claim 6, wherein
   the at least one digital processor of a module is configurable; and
   the central processing unit of the module is further for configuring the at least one digital signal processor of the module to perform said some of the functions.

8. The arrangement of claim 6 wherein
   each individual module includes means for obtaining the memory contents from an external source for storage in the memory.

9. The arrangement of claim 8 wherein
   the obtaining means of each module of the set of modules other than the master module comprise the first communications interface; and the obtaining means of the master module comprise a communications interface to a storage device external to the master module.

10. A communications-processing system comprising:

a set of a plurality of multi-function modules for together performing communications-processing functions, the modules of the set of modules being physically identical and each module comprising a first interfere to a control communications link that interconnects the set of modules for inter-module communications, a second interface to an external voice-communications link, at least one configurable digital signal processor coupled by the second interface to the voice-communications link for performing voice-processing functions on communications flowing between the voice-communications link and the module, a memory for storing definitions of communications-processing functions that are to be performed by this module, a central processing unit for performing some of the functions defined by contents of the memory and for configuring the at least one digital signal processor to perform others of the functions defined by the contents of the memory, and a communications medium communicatively interconnecting the above-recited elements of the module; and each module of the set of modules being programmable, under direction of one module of the set of modules that is designated a master module, to become able to perform any one or more functions of the communications processing functions, a master module including program means executed by the central processing unit for specifying to the master module, and for specifying to each module of the set of modules other than the master module via the control communications link, the one or more communications-processing functions that the module is to become able to perform, and each module of the set of modules including program mean executed by the central processing unit, responsive to the specification received from the specifying means, for obtaining and storing in the memory programs for execution by the central processing unit of cause the module to become able to perform the specified one or more communications-processing functions.

11. The system of claim 10 wherein each module of to the set of modules further comprises a third interface to external alarms and indicators; and a fourth interface to an external digital data or control communications link.

12. The system of claim 10 wherein each module of the set of modules further comprises a third interface to an external storage device for storing programs defining the communications-processing functions.

* * * * *